United States Patent
Zou et al.

(10) Patent No.: US 10,380,791 B2
(45) Date of Patent: Aug. 13, 2019

(54) SYSTEM AND METHOD FOR GENERATION OF SHADOW EFFECTS IN THREE-DIMENSIONAL GRAPHICS

(71) Applicant: Robert Bosch GmbH, Stuttgart (DE)

(72) Inventors: Lincan Zou, San Jose, CA (US); Liu Ren, Cupertino, CA (US)

(73) Assignee: Robert Bosch GmbH, Stuttgart (DE)

( * ) Notice: Subject to any disclaimer, the term of this patent is extended or adjusted under 35 U.S.C. 154(b) by 74 days.

(21) Appl. No.: 15/644,934

(22) Filed: Jul. 10, 2017

(65) Prior Publication Data

US 2017/0309064 A1 Oct. 26, 2017

Related U.S. Application Data

(62) Division of application No. 13/828,772, filed on Mar. 14, 2013, now Pat. No. 9,792,724.

(51) Int. Cl.
*G06T 15/60* (2006.01)

(52) U.S. Cl.
CPC .................... *G06T 15/60* (2013.01)

(58) Field of Classification Search
None
See application file for complete search history.

(56) References Cited

U.S. PATENT DOCUMENTS

| | | | |
|---|---|---|---|
| 5,808,620 A | 9/1998 | Doi et al. | |
| 6,437,782 B1 | 8/2002 | Pieragostini et al. | |
| 7,212,206 B2 | 5/2007 | Green | |
| 7,242,408 B1 | 7/2007 | Dunn | |
| 8,436,855 B1 | 5/2013 | Morgan et al. | |
| 2003/0112237 A1 | 6/2003 | Corbetta | |
| 2006/0152503 A1 | 7/2006 | Lee et al. | |
| 2011/0043523 A1 | 2/2011 | Kim et al. | |

(Continued)

FOREIGN PATENT DOCUMENTS

| | | |
|---|---|---|
| EP | 0702333 A2 | 3/1996 |
| EP | 1209629 A1 | 5/2002 |
| JP | H0896161 A | 4/1996 |

(Continued)

OTHER PUBLICATIONS

Supplementary European Search Report corresponding to European Patent Application No. 15 87 6330 (7 pages).

(Continued)

*Primary Examiner* — Edward Martello
(74) *Attorney, Agent, or Firm* — Maginot Moore & Beck LLP

(57) ABSTRACT

Methods for generating ground shadow and lighting effects for three-dimensional models include identifying polygon data for a three-dimensional model, generating a convex polygon around a base of the model, generating hard and soft shadow meshes in and around the base of the model, and rendering the model with the shadow meshes with a display device. Methods for generating wall shadows and lighting effects for the three dimensional models further include identifying an orientation and height of a polygon in the model that extends from a ground surface in a virtual environment, and rendering the model with a lighting texture applied to either the full polygon if the polygon height is less than a threshold height or to only a portion of the polygon below the threshold height if the polygon exceeds the threshold height.

8 Claims, 10 Drawing Sheets

(56) References Cited

U.S. PATENT DOCUMENTS

2014/0176546 A1    6/2014    Hart

FOREIGN PATENT DOCUMENTS

| JP | 3152820 B2 | 1/2001 |
|---|---|---|
| KR | 10-0896137 B1 | 5/2009 |
| WO | 2014159285 A1 | 10/2014 |

OTHER PUBLICATIONS

Chan, "Optimal output-sensitive convex hull algorithms in two and three dimensions", Discrete and Computational Geometry, 1996, pp. 361-368, vol. 16, Springer-Verlag, Canada (8 pages).

Crow, "Shadow algorithims for computer graphics", Computer Graphics, 11, 2 (Proceedings of ACM SIGGRAPH 77), 1977, pp. 242-248, Austin, USA (7 pages).

Shanmugam et al., Hardware accelerated ambient occlusion techniques on GPUs, In Proceedings of 13D (2007), 2007, pp. 73-80, ACM, Austin, USA (8 pages).

Williams, "Casting curved shadows on curved surfaces," Computer Graphics, 12, 3 (Proceedings of ACM SIGGRAPH 78), 1978, pp. 270-274, Westbury, USA (5 pages).

Thirion, Jean-Philippe, Realistic 3D simulation of shapes and shadows for image processing; [Research Report] RR-1344, 1990. <inria-00075215>; https://hal.inria.fr/inria-00075215; published Nov. 1990; available online May 2006 (25 pages).

Chin, Norman et al., "Near Real-Time Shadow Generation Using BSP Trees;" ACM; Computer Graphics, vol. 23, No. 3, pp. 99-106, Jul. 1989 (8 pages).

Lischinski et al.; "Combining Hierarchical Radiosity and Discontinuity Meshing;" ACM; Computer Graphics, vol. 27, No.3, pp. 199-208, Aug. 1993 (10 pages).

Soler-Bientz et al.; Developing a Computational Tool to Assess Shadow Pattern on a Horizontal Plane, Preliminary Results; pp. 002312-002317; 35th IEEE Photovoltaic Specialists Conference (PVSC), Jun. 2010 (6 pages).

Frueh, Christian et al.; "Automated Texture Mapping of 3D City Models With Oblique Aerial Imagery;" Proceedings of the 2nd International Symposium on 3D Data Processing, Visualization, and Transmission (3DPVT'04); Aug. 2004 (8 pages).

Bala et al.; "Combining Edges and Points for Interactive Anti-Aliased Rendering;" Cornell University Program of Computer Graphics Technical Report: PCG-02-3, Jan. 2002; (11 pages).

International Searching Authority, International Search Report and Written Opinion, dated Aug. 25, 2014 (13 pages).

European Patent Office, Supplemental Partial European Search Report, dated Sep. 26, 2016 (7 pages).

SYSTEM AND METHOD FOR GENERATION OF SHADOW EFFECTS IN THREE-DIMENSIONAL GRAPHICS

CLAIM OF PRIORITY

This application is a divisional of and claims priority to copending U.S. application Ser. No. 13/828,772, which was filed on Mar. 14, 2013, the entire contents of which are hereby incorporated herein by reference.

FIELD

This disclosure relates generally to the field of computer graphics and, more specifically, to systems and methods for generating shadow effects in three-dimensional computer graphics.

BACKGROUND

Many modern software applications display three-dimensional representations of objects and scenes as part of a user interface. Three-dimensional (3D) graphics are used in a wide range of applications including video games, simulations, virtual reality applications, geospatial information applications, and applications for mapping and navigation. In many applications, 3D graphics are more useful than two-dimensional (2D) graphics at depicting real-world environments and locations because the normal interaction between humans and the real-world occurs in three dimensions.

In one form of 3D graphics, different objects in a scene are formed from a large number of polygons. The polygons form shapes and structures in a 3D scene. Since most computing devices only display graphics with a two-dimensional display, the 3D graphics are converted into a rasterized array of two-dimensional pixels for display. The 2D display depicts portions of the three-dimensional scene in a similar manner to how a camera takes a two-dimensional photograph of 3D scenes in the real world. Many 3D graphics systems and application programming interfaces (APIs) including the Open Graphics Library (OpenGL) and the Direct 3D APIs provide common structures and interfaces to specialized graphics hardware for generation of 3D images in an efficient manner. The 3D software interacts with general purpose and specialized digital computing hardware that generates the 3D graphics in an efficient manner. In particular, graphical processing units (GPUs) are hardware components that are configured to generate polygons and other graphical effects that form a 3D scene. Modern computing devices typically execute software with a combination of instructions for a central processing unit (CPU) and the GPU to generate the 3D scene and enable interaction with the 3D scene in some software applications. In some hardware embodiments, the functionality of the CPU and GPU are merged together, physically and optionally logically, into a single a system on a chip (SoC) device.

In modern 3D graphics, the final display includes additional graphical details that go beyond a simple rendering of polygons to provide additional detail and realism. For example, rendered polygons typically receive one or more textures that simulate the appearance of materials in the real world such as wood, stone, metal, cloth, and many other materials. The appearance of a scene is also heavily influenced by the light sources that illuminate the scene. For example, a building appears much different in daylight than at night, and even in daylight the appearance of the building changes based on weather conditions and on the length and orientation of shadows. In 3D graphics, shadows are often generated using one or more mathematical techniques such as ray casting, shadow maps, and shadow volumes in modern 3D hardware and software systems. The existing techniques generate shadows based on the interaction between one or more light sources that illuminate a scene and the sizes and arrangements of objects in the scene that produce the shadows. The different shadow generation techniques include tradeoffs between the accuracy of the generated shadows and the required computational complexity for generating the shadows.

Modern 3D hardware and software systems are capable of producing shadows in graphics, including animated graphics with shadows that move along with the objects that cast the shadows. Despite the capabilities of modern computing devices, the generation of shadows in a 3D scene remains a computationally intensive operation. Many computing devices, which include embedded computing devices such as an in-vehicle computer and mobile electronic devices, which include smartphones, tablets, and GPS navigation devices, have relatively simple hardware capabilities. Some of these devices are unable to generate realistic shadows in an efficient manner. In some cases, even if the device has the hardware capability to produce 3D graphics with shadows using conventional techniques, the added computational complexity results in greater power consumption and a loss in battery life due to the computational requirements for generating the shadows in the 3D scene. Consequently, improved techniques for rendering shadows in 3D scenes in an efficient manner would be beneficial.

SUMMARY

In one embodiment, a method for generating a shadow for a three-dimensional graphics object has been developed. The method includes identifying data corresponding to a plurality of polygons in a three-dimensional graphical model that depicts an object, identifying a plurality of coordinates corresponding to vertices in the plurality of polygons in a base of the object, generating a convex polygon that encompasses the plurality of coordinates, generating a hard shadow mesh corresponding to the convex polygon, the hard shadow mesh including a plurality of vertices, generating a soft-shadow mesh including a plurality of polygons that each include at least one vertex in common with the plurality of vertices in the hard shadow mesh, applying a predetermined shadow texture to the soft shadow mesh, and rendering the object and the shadow mesh in the three-dimensional graphical model with a display device to depict the object with a ground shadow effect.

In another one embodiment, a system that displays a shadow for a three-dimensional graphics object has been developed. The system includes a memory configured to store data corresponding to a plurality of polygons in a three-dimensional graphical model that depicts an object, a display device configured to generate a visual depiction of the three-dimensional graphical model, and a processor operatively connected to the memory and the display device. The processor is configured to identify the plurality of polygons in the data corresponding to the three-dimensional graphical model stored in the memory, identify a plurality of coordinates corresponding to vertices in the plurality of polygons in a base of the object, generate a convex polygon that encompasses the plurality of coordinates, generate a hard shadow mesh corresponding to the convex polygon, the hard shadow mesh including a plurality of vertices, generate a soft-shadow mesh including a plurality of polygons that each include at least one vertex in common with the plurality of vertices in the hard shadow mesh, apply a predetermined shadow texture to the soft shadow mesh, and render the three-dimensional graphical model with the object and the textured soft shadow mesh with the display device to depict the object with a ground shadow effect.

In another embodiment, a method for applying a lighting texture to a three-dimensional graphics object has been developed. The method includes identifying data corresponding to a plurality of polygons in a three-dimensional graphical model that correspond to an object, identify an orientation of one polygon in the plurality of polygons with respect to a surface that engages the object in the three-dimensional graphical model, identifying a dimension of the one polygon in the identified orientation extending from the surface, mapping a predetermined lighting texture to an entire face of the one polygon in response to the identified dimension of the one polygon being less than a predetermined threshold, mapping the predetermined lighting texture to only a portion of a face of the one polygon with a dimension extending from the surface by a predetermined distance in response to the identified dimension of the one polygon being greater than the predetermined threshold, and generating a display of the three-dimensional graphical model including the one polygon in the object with the mapped predetermined lighting texture.

In another embodiment, a system that applies a lighting texture to a three-dimensional graphics object has been developed. The system includes a memory configured to store data corresponding to a plurality of polygons in a three-dimensional graphical model that depicts an object, a display device configured to generate a visual depiction of the three-dimensional graphical model, and a processor operatively connected to the memory and the display device. The processor is configured to identify an orientation of one polygon in the plurality of polygons that correspond to the object with respect to a surface that engages the object in the three-dimensional graphical model in the memory, identify a dimension of the one polygon in the identified orientation extending from the surface, map a predetermined lighting texture that is stored in the memory to an entire face of the one polygon in response to the identified dimension of the one polygon being less than a predetermined threshold, map the predetermined lighting texture to only a portion of a face of the one polygon with a dimension extending from the surface by a predetermined distance in response to the identified dimension of the one polygon being greater than the predetermined threshold, and generate a display of the three-dimensional graphical model including the one polygon in the object with the mapped predetermined lighting texture.

DETAILED DESCRIPTION

Figure 1:
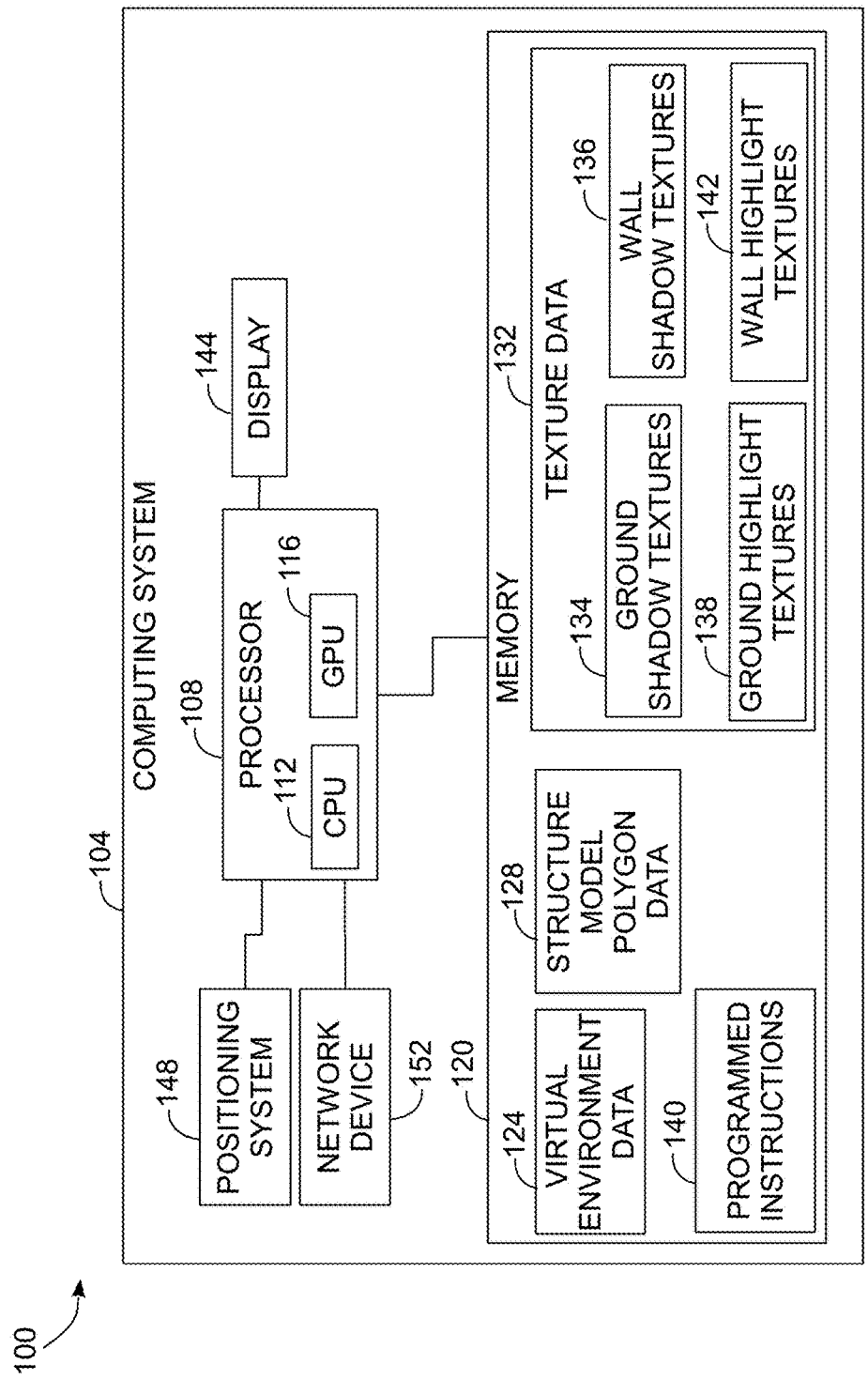
FIG. 1 is a schematic diagram of a computing device that is configured to generate three-dimensional (3D) graphics including ground shadows and wall shadows generated on graphical representations of 3D structures in a virtual environment.

For the purposes of promoting an understanding of the principles of the embodiments disclosed herein, reference is now be made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

As used herein, the term "texture" refers to any graphical image or images that are mapped to one or more polygons in a three-dimensional display to alter the appearance of the polygons in a graphical display. As used herein, the term "lighting texture" refers to textures that affect the perceived brightness, darkness, or color shading of a polygon in the graphical display. As used herein, the term "shadow texture" refers to a type of lighting texture that darkens the appearance of a polygon in a similar manner to a shadow that darkens an appearance of an object in the physical world. As used herein, the term "highlight texture" refers to a texture that brightens the appearance of a polygon in a similar manner to how lights shining on an object brighten an appearance of the object in the physical world. In addition to standard shadow and highlight textures, other lighting texture effects change the perceived display of three-dimensional polygons in a display. For example, lighting textures include pencil hatching shading and oil-painting effects that are applied on and around a three-dimensional model to achieve a predetermined aesthetic effect. As is known in the art, one texture or multiple textures can be applied to a polygon using, for example, texture mapping techniques that are specified in the OpenGL and Direct 3D standards.

As used herein, the term "object" refers to data that correspond to a group of polygons in a virtual environment that form a model of a single object in the larger virtual environment. As used herein, the term "structure" refers to an object with polygons that are positioned and oriented in the 3D virtual environment to stand on a virtual representation of ground or the surface of the earth. Common examples of structures include representations of manmade objects such as buildings, bridges, monuments, and other artificial constructions. Natural structures include representations of trees and vegetation, cliffs, rock outcroppings, and other objects that correspond to natural features.

Structures in a 3D virtual environment extend from the virtual representation of the ground. The polygons that define each structure provide a shape for the structure, and the structure is also oriented in a predetermined manner to emerge from the ground in an expected manner. In one embodiment of a computing device using software and hardware that is compatible with the OpenGL 3D graphics standard, the orientation of a structure is specified using a rotational matrix to orient the structure with the base of the structure engaging the ground and other polygons in the structure extending from the ground. For example, a 3D object representing a building includes a base that corresponds to the foundation of the building engaging the ground in the virtual environment. The polygons in the structure that extend upward from the ground are referred to as "walls," although the polygons do not necessarily have to depict walls of a building. As used herein, the term "base" as applied to a structure refers to the locations of polygon vertices in the structure model that correspond to the outermost coordinates for each polygon from a center of the structure as viewed from overhead in the same manner as in a conventional two-dimensional map. For example, if the structure is a simple cube, then the base is defined by the locations of the four corners of the cube as viewed from above. The base in some structure models corresponds to the location where the structure meets the ground, such as the foundation in many buildings. In some structure models, however, the base includes polygon vertices that are above the ground level, such as structures that are formed with overhangs and other projections that extend from the center of the building as viewed from above, but do not contact the ground.

FIG. 1 depicts a computing system 104 that generates a graphical display of a 3D virtual environment including a representation of ground, such as the surface of the Earth, with ground lighting and wall lighting textures applied to the regions surrounding the structures and to the polygons that depict walls of the structures. The computing system 104 includes a processor 108, memory 120, display 144, optional positioning system 148, and optional network device 152. Hardware embodiments of the computing system 104 include, but are not limited to, personal computer (PC) hardware, embedded system hardware including embedded computing hardware for use in a motor vehicle, and mobile electronic devices including smartphone and tablet computing devices.

In the computing system 104, the processor 108 includes one or more integrated circuits that implement the functionality of a central processing unit (CPU) 112 and graphics processing unit (GPU) 116. In some embodiments, the processor is a system on a chip (SoC) that integrates the functionality of the CPU 112 and GPU 116, and optionally other components including the memory 120, network device 152, and positioning system 148, into a single integrated device. In one embodiment, the CPU is a commercially available central processing device that implements an instruction set such as one of the x86, ARM, Power, or MIPs instruction set families. The GPU includes hardware and software for display of both 2D and 3D graphics. In one embodiment, processor 108 executes software drivers and includes hardware functionality in the GPU 116 to generate 3D graphics using the OpenGL, OpenGL ES, or Direct3D graphics application programming interfaces (APIs). For example, the GPU 116 includes one or more hardware execution units that implement pixel shaders, fragment shaders, and vertex shaders for the processing and display of 2D and 3D graphics. During operation, the CPU 112 and GPU 116 execute stored programmed instructions 140 that are retrieved from the memory 120. In one embodiment, the stored programmed instructions 140 include operating system software and one or more software application programs that generate 3D graphics, including mapping and navigation applications, virtual reality applications, game applications, simulation applications, and any other software that is configured to generate 3D graphics. The processor 108 executes the mapping and navigation program and generates 2D and 3D graphical output corresponding to maps and map features through the display device 144. The processor is configured with software and hardware functionality by storing programmed instructions in one or memories operatively connected to the processor and by operatively connecting the hardware functionality to the processor and/or other electronic, electromechanical, or mechanical components to provide data from sensors or data sources to enable the processor to implement the processes and system embodiments discussed below.

The memory 120 includes both non-volatile memory and volatile memory. The non-volatile memory includes solid-state memories, such as NAND flash memory, magnetic and optical storage media, or any other suitable data storage device that retains data when the in-vehicle information system 104 is deactivated or loses electrical power. The volatile memory includes static and dynamic random access memory (RAM) that stores software and data, including graphics data and map feature data, during operation of the in-vehicle information system 104. In addition to the programmed instructions 140, the memory 120 includes virtual environment data 124, structure polygon data 128, and texture data 132. The virtual environment data 124 includes a model of a virtual environment include ground terrain information, coordinates and orientation data for multiple 3D objects that are located in the virtual environment, and additional environmental data including virtual lighting sources that illuminate the virtual environment. The structure model polygon data 128 include a plurality of models for three-dimensional structures that are formed from multiple polygons. The data include vertices with three-dimensional coordinates that define a series of interconnected polygons, such as triangles, that form the shape of a structure in the 3D virtual environment. The processor 108 is configured to adjust the relative size and orientation of the each structure model to place the model in the 3D virtual environment, and a 3D virtual environment can include many copies and variations of a single structure model.

In the memory 120, the texture data 132 include a plurality of textures, which are typically 2D images, mapped to the surfaces of the structures in the 3D virtual environment to provide more realistic appearances to the polygon structure models. The texture data memory 132 also stores light textures including ground shadow textures 134 and ground highlight textures 138. The ground shadow textures 134 are used to darken areas around the bases of structures in the 3D virtual environment, while the ground highlight textures are used to brighten areas around the bases of the structures. The texture data 132 memory also stores wall shadow textures 136 and wall highlight textures 142. The wall shadow textures 136 are used to darken selected polygons in structure models to simulate the effects of reflected light from surrounding objects in the 3D virtual environment, and the wall highlight textures 142 brighten selected polygons in the structure models to simulate the effects of reflected light from ground-level light sources in the 3D virtual environment.

The computing system 104 includes an optional network device 152 that is configured to send and receive data from external computing systems through a data network (not shown). Examples of the network device 152 include wired network adapters such as Ethernet and universal serial bus (USB) adapters, and wireless network adapters such as 3G or 4G wireless wide area network (WWAN), 802.11 or Bluetooth wireless local area network (WLAN) adapters. In some embodiments, the processor 108 retrieves virtual environment data 124, structure model polygon data 128, and texture data 132 from an external network for storage in the memory 120. In some embodiments, the memory 120 caches the graphics data and the processor 108 stores additional graphical data that is received through the network device 152 to update the contents of the memory 120.

The computing system 104 includes an optional positioning system device 148 that is operatively connected to the processor 108. Examples of positioning systems include global positioning system (GPS) receivers, radio triangulation receivers that identify a location of the computing system 104 with respect to fixed wireless transmitters, and inertial navigation systems. During operation, the processor 108 executes mapping and navigation software applications that retrieve location information from the positioning system 148 to identify a geographic location of the computing system 104 and to adjust the display of the virtual environment to correspond to the location of the computing system 104. In navigation applications, the processor 108 identifies the location and movement of the computing system 104 for the generation of routes to selected destinations and display of the routes in the 3D virtual environment.

In the computing system 104, the display 144 is either an integrated display device, such as an LCD or other display device, which is integrated with a housing of the computing system 104, or the display 144 is an external display device that is operatively connected to the computing system 104 through a wired or wireless interface to receive output signals from the controller 108 to generate a display of the 3D virtual environment. In an embodiment where the computing system 104 is an in-vehicle embedded computing device, the display 144 is an LCD or other flat panel display that is located in the console of a vehicle, or the display 144 is a head-up display (HUD) or other projection display that displays the 3D virtual environment on a windshield or other display surface in the vehicle.

Figure 2:
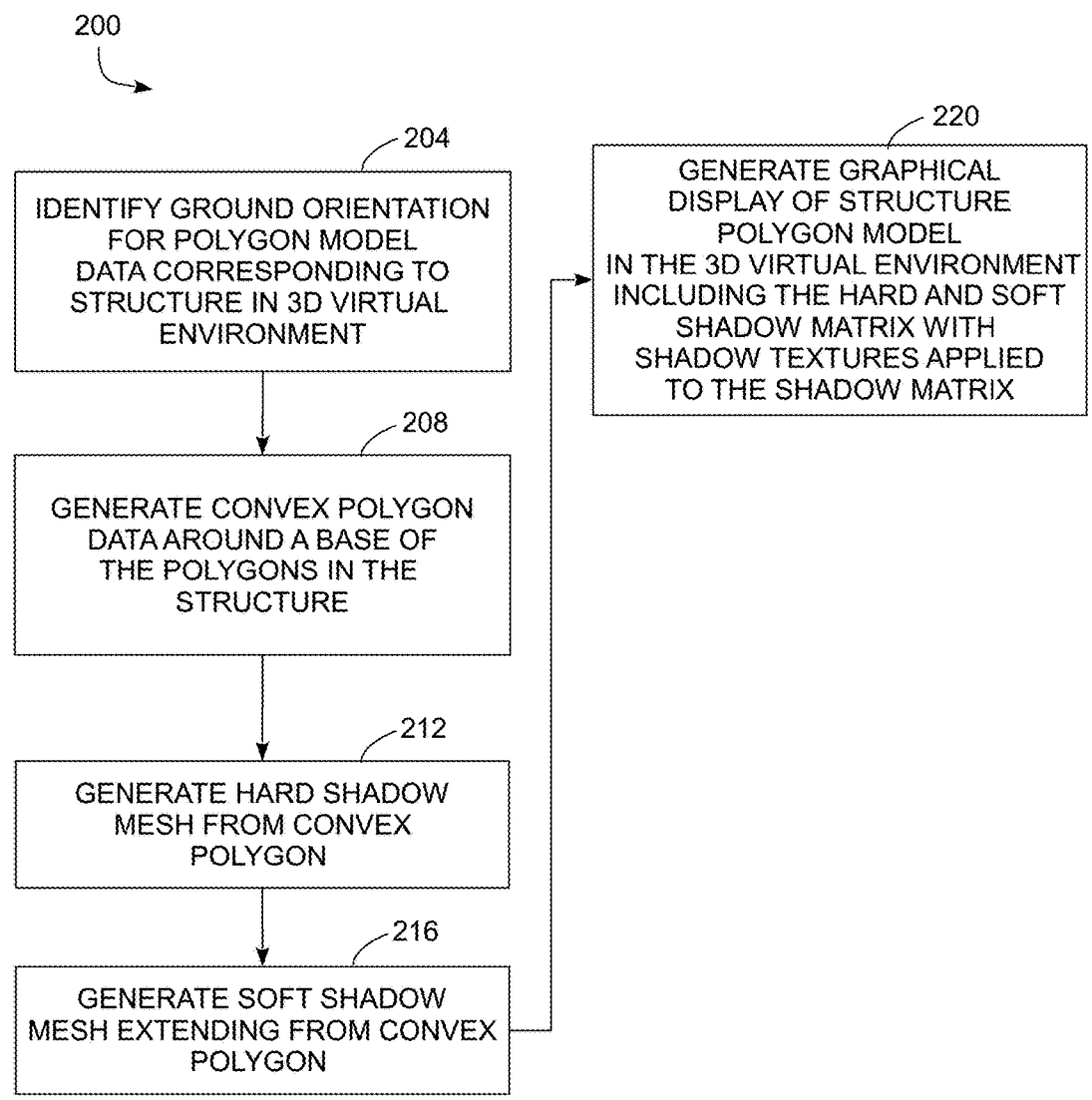
FIG. 2 is a block diagram of a process for generating and displaying ground shadows for a structure in a 3D virtual environment.

FIG. 2 depicts a process 200 for generating a ground lighting mesh that is displayed around a base of a structure in a 3D virtual environment. In one embodiment, the ground lighting mesh is a shadow mesh that depicts a ground shadow effect around the structure. In the description below, a reference to the process 200 performing or doing some function or action refers to one or more controllers or processors that are configured with programmed instructions, which are executed by the controllers or processors to implement the process performing the function or action or operating one or more components to perform the function or action. The process 200 is described with reference to the computing system 100 of FIG. 1 for illustrative purposes.

Process 200 begins as the processor 108 identifies a ground orientation for polygon model data in the memory 120 (block 204). The processor 108 loads polygon data corresponding to a structure from the structure model polygon data 128 in the memory 120. The processor 108 also retrieves virtual environment data 124 from the memory 120 including a region of the virtual environment that includes the structure. The virtual environment data include the location of the structure as specified using three-dimensional numeric coordinates that correspond to the location of the structure on a surface of the virtual environment, which is typically a virtual representation of the ground in the virtual environment. In addition to the location data for the building, the virtual environment data also include a rotation matrix or other orientation data that describe a relative orientation for the structure model in the virtual environment. In one embodiment, a default rotation matrix describes the orientation of multiple structures in the virtual environment. For example, in many virtual environments the terrain under a structure is represented as a level surface, and the structure is oriented to extend in a perpendicular manner from the surface. A default rotation matrix is used to orient a large number of structures in a perpendicular direction to the surface in the virtual environment.

Process 200 continues as the processor 108 generates a convex polygon around the base of the structure (block 208). As described above, the term "base" refers to the outermost vertices in the polygons that form the structure as depicted in an overhead view. The identified orientation of the structure in the virtual environment enables the processor 108 to identify the vertices forming the base in an accurate manner for the overhead view. For example, if the structure model represents a skyscraper, then the orientation data enables the processor 108 to identify the base of the skyscraper including polygon vertices that correspond to the vertices of polygons that correspond to the sides of the skyscraper as viewed from above. In one embodiment, only vertices that are within a predetermined distance of the ground in the virtual environment are included in the base of the structure. For example, a footprint of a 3D object can be the projection of all vertices in a 3D object on the ground. The vertices in the base are selected from the total set of vertices V in the structure model. Each vertex V is a 3D vertex with three components: x, y, and z. $V_z$ represents the height of V. G is the ground elevation in the virtual environment. The processor 108 includes a vertex in the base only if the height of the vertex above the ground is less than a predetermined height threshold ε. For example, the following equations for f(V) provide a result of 1 when the vertex is included in the base:

$$f(V) = \begin{cases} 0 & \text{if } V_z - G \geq \varepsilon \\ 1 & \text{otherwise} \end{cases}$$

Figure 3:
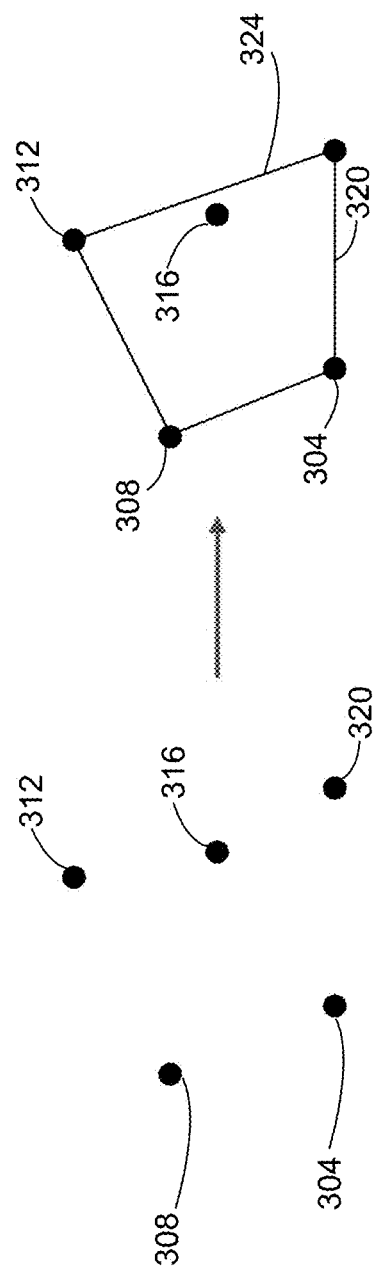
FIG. 3 is a diagram of a convex polygon formed around vertices in the base of a polygon model for a structure in a 3D virtual environment.

The convex polygon either surrounds the vertices in the base of the structure, or uses the vertices in the base as vertices in the convex polygon. More informally, the convex polygon includes the same form as a rubber band that stretches around the outermost vertices in the base. The processor 108 generates the convex polygon using convex hull generation algorithms that are known to the art. FIG. 3 depicts an example of vertices 304, 308, 312, 316, and 320 in the base of a structure. The processor 108 generates the convex polygon 324 including the vertices 304, 308, 312, and 320 as vertices in the convex polygon 324. The convex polygon 324 also encompasses the vertex 316 from the base of the structure model.

Figure 4:
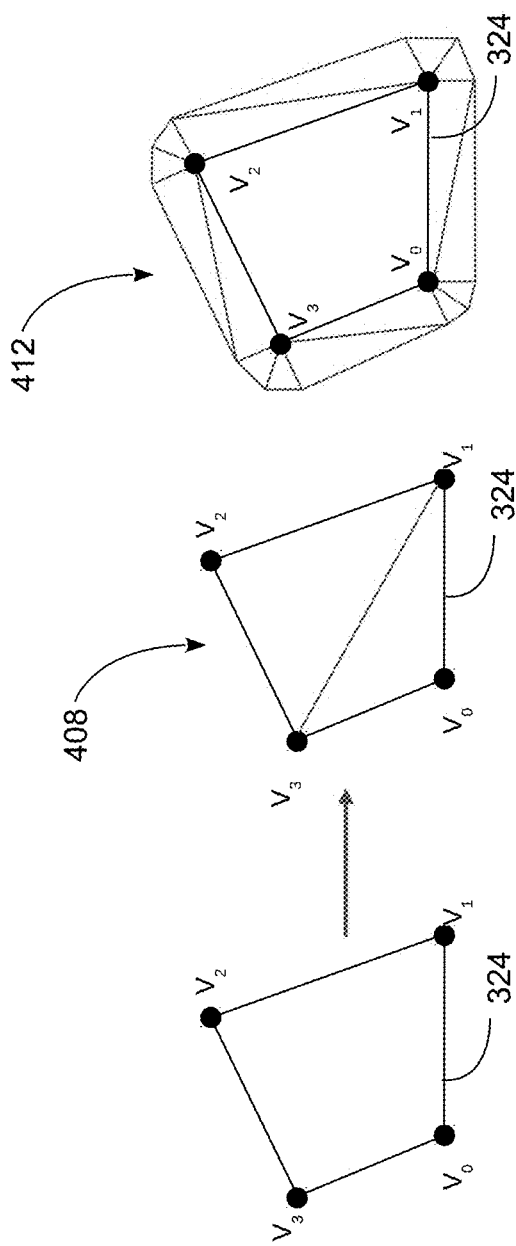
FIG. 4 is a diagram depicting ground shadow meshes formed around the convex polygon of FIG. 3.

Process 200 continues with the generation of a hard shadow mesh from the convex polygon (block 212). The hard shadow mesh is a polygonal mesh that corresponds to the exact shape of the convex polygon. In one embodiment, the processor 108 tessellates the convex polygon to form a mesh including one or more triangles that fill the convex polygon. As described below, the hard shadow mesh is used to map a lighting texture, including shadow textures and highlight textures, to a region that is directly under the base of the structure. FIG. 4 depicts a hard shadow mesh formed from the convex polygon 324.

Figure 5:
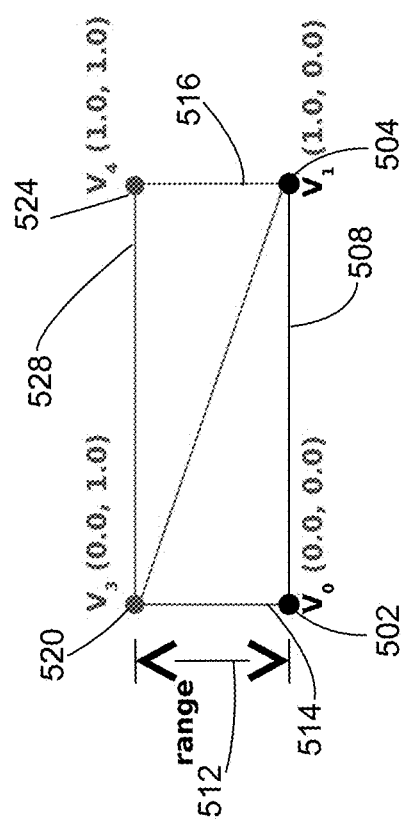
FIG. 5 is a diagram depicting a first section of a ground shadow mesh that extends from a single side of a polygon.
Figure 6:
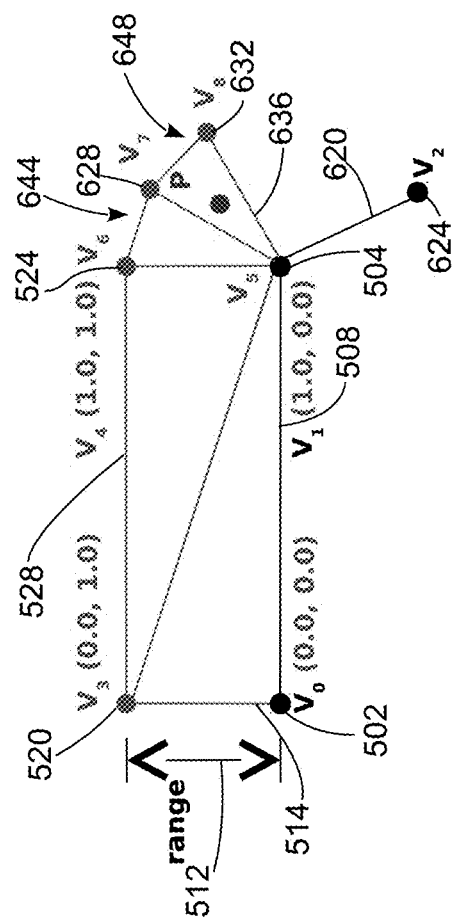
FIG. 6 is a diagram depicting a second section of a ground shadow mesh that extends from a vertex of a polygon.

Referring again to FIG. 2, process 200 continues with generation of a soft shadow mesh that extends outward from the convex polygon (block 216). The hard shadow mesh covers only the convex polygon, which in turn corresponds to a region that is encompassed by the structure. By contrast, the soft shadow mesh extends outward from the convex polygon to cover a region that surrounds the structure in the virtual environment. The soft shadow mesh is generated with the appearance of rounded corners to produce an appearance of a diffuse shadow in the virtual environment. The processor 108 generates the soft shadow mesh in an iterative manner using each of the vertices in the convex polygon as a basis for the soft shadow mesh triangles. Each pair of vertices that are co-linearly connected by a side of the convex polygon form a side of a rectangle that extends outward from the convex polygon by a predetermined shadow distance. The processor 108 generates a series of triangles that extend outwardly from the vertices of the convex polygon to fill gaps between the rectangles to form a continuous mesh that surrounds the convex polygon. FIG. 5 and FIG. 6 provide additional illustrations for the generation of the soft shadow mesh.

FIG. 5 depicts one side 508 of a convex polygon corresponding to the base of a structure in the 3D virtual environment and a polygon mesh 528 that extends outwardly from the side 508. The side 508 includes two co-linear vertices 502 and 504 that are vertices in a convex polygon. The remainder of the convex polygon is omitted from FIG. 5 for clarity. During the soft shadow mesh generation in process 200, the processor 108 generates a rectangle using the side 508 that extends between convex polygon vertices 502 and 504 as one side of the rectangle. The processor 108 generates the rectangle with sides 514 and 516 that have a predetermined length corresponding to a predetermined range 512. The range 512 provides a uniform distance for the soft-shadow mesh to extend outwardly from the structure on all sides of the structure. The processor 108 tessellates the rectangle to form the soft shadow mesh 528 with a first triangle that is formed by vertices 502, 504, and 520, and a second triangle that is formed by vertices 504, 520, and 524.

FIG. 6 depicts generation of triangles for the soft-shadow mesh around a corner of the convex polygon. In FIG. 6, the vertices 504 and 624 form another side 620 of the convex polygon. The angle between the two sides is subdivided into a plurality of triangles with the example of FIG. 6 including two triangles, while alternative embodiments use either a single triangle or a larger number of triangles to subdivide the angle. In FIG. 6, one triangle is defined by the vertices 504, 524, and 628, and the other triangle being defined by vertices 504, 628, and 632. The sides of the triangles that project outward from the vertex 504, such as side 636, each have the same length as the range 512 and the sides of the rectangle that form the mesh 528.

Process 200 continues as the processor 108 generates the shadow mesh around the outer perimeter of the convex polygon in an iterative manner as depicted above in FIG. 5 and FIG. 6. FIG. 4 depicts a completed soft shadow mesh 412 that is formed around the concave polygon 324. Referring again to FIG. 2, process 200 generates a graphical depiction of the structure in the virtual environment including ground effect shadow or highlight features using the polygon model data for the structure and a shadow or highlight texture that is applied to the hard shadow mesh and soft shadow mesh (block 220). The processor 108 loads a selected shadow texture 134 or a ground highlight texture 138 from the texture data 132 in the memory 120 for the structure. In one embodiment, the processor 108 selects a ground shadow texture 134 when the virtual environment is depicted in daylight, and the processor 108 selects a ground highlight texture 138 when the virtual environment is depicted at night.

To generate a display of the virtual environment with the display device 144, the processor 108 places the hard and soft shadow meshes over unobstructed surfaces in the virtual environment to enable display of the shadows. In some embodiments, the shadow and highlight textures are partially transparent to enable partial visibility of the underlying surfaces in the virtual environment. Additionally, some embodiment of the shadow and highlight textures are formed with a gradient where the intensity of the texture is greatest at a location that is proximate to the structure in the shadow mesh and where the intensity gradually dissipates as the shadow mesh extends away from the structure. In one embodiment, the processor 108 applies the shadow or highlight texture to the corner triangles in the soft-shadow mesh, such as the triangles 644 and 648 in FIG. 6, using the following texture mapping coordinate transformations in conjunction with the triangular mesh in FIG. 6:

$$u = \mathrm{angle}(\angle V_6 V_5 P)/\mathrm{angle}(\angle V_6 V_5 V_8) \ v = \mathrm{length}(V_5 P)/\mathrm{range}$$

Where u and v are two-dimensional coordinates in the texture graphic, P represents the sampled point in the rasterized triangle, and range is the predetermined length of the triangle sides that extend from the concave polygon. Each pixel P in the triangles of the shadow mesh receives a mapped texture coordinate from the shadow mesh. The texture mapping enables generation of a uniform shadow or highlight extending from the structure in the display of the virtual environment. In the computing system 104, one or more pixel shader units in the GPU 116 perform the shadow or texture mapping process in an efficient manner.

Figure 8:
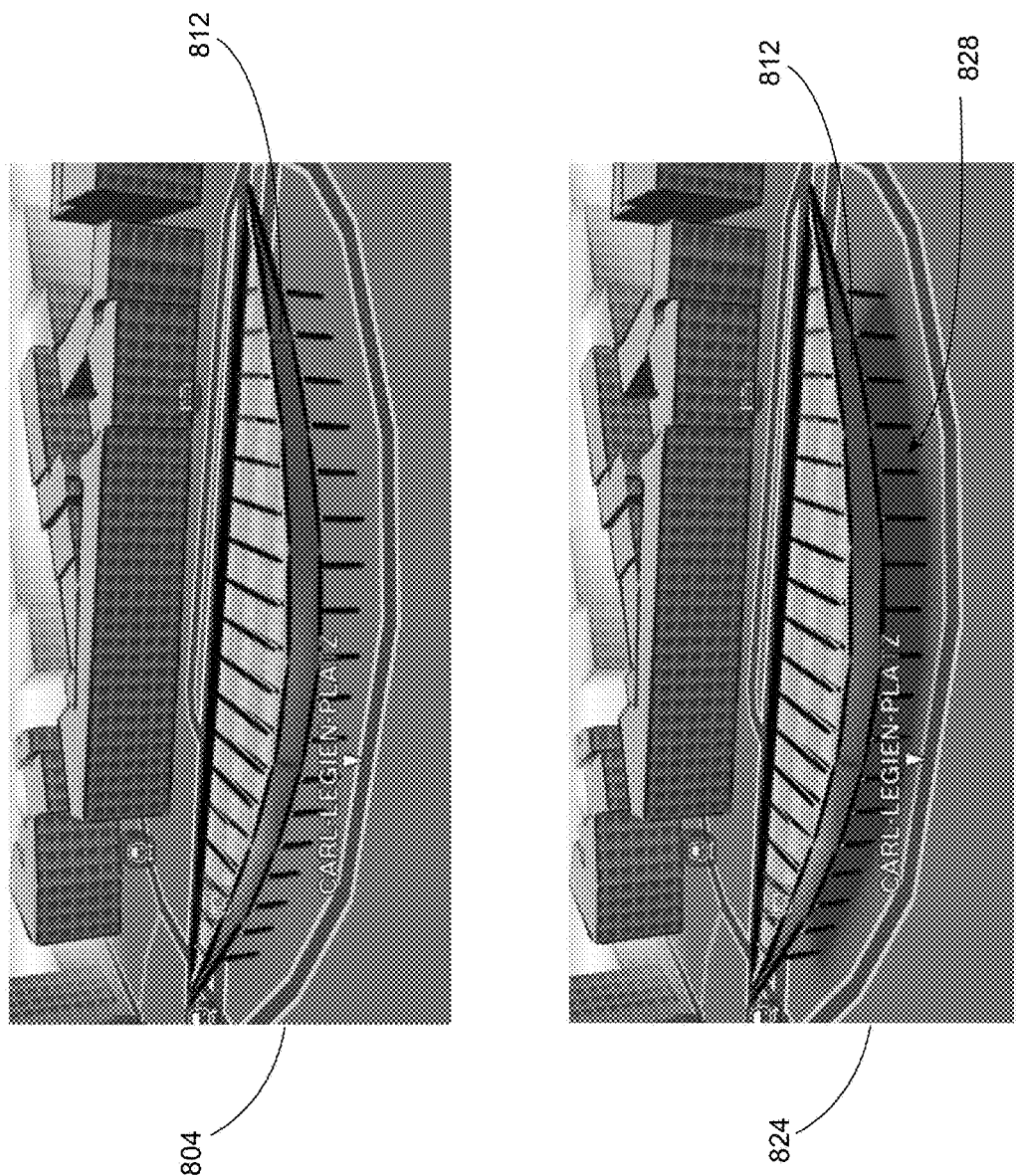
FIG. 8 is a first graphical display of a 3D structure without a ground shadow and a second graphical display of the 3D structure with the ground shadow that is generated using the process of FIG. 2.

FIG. 8 depicts two displays 804 and 824 of a structure 812 in a virtual environment. In the display 804, the structure 812 is depicted without a ground shadow effect. In the display 824, the structure 812 is displayed with a ground effect shadow 828 that the processor 108 generates using process 200 as described above. The processor 108 generates the display 824 using the display device 144. In the display 824, the shadow 828 extends under the structure 812 in the hard shadow mesh region, and the shadow extends past the base of the structure 812 in the soft shadow mesh region. As described above with reference to FIG. 2, the processor 108 maps selected coordinates in the shadow textures to coordinates in the soft shadow mesh to produce the shadow with edges that gradually decrease in intensity as the shadow extends outward from the base of the building 812. While FIG. 8 depicts a shadow, a highlight texture can be applied to generate a highlight effect around the structure 812 to simulate the effects of streetlights or other light sources when the virtual environment is depicted at night instead of during the day.

Figure 7:
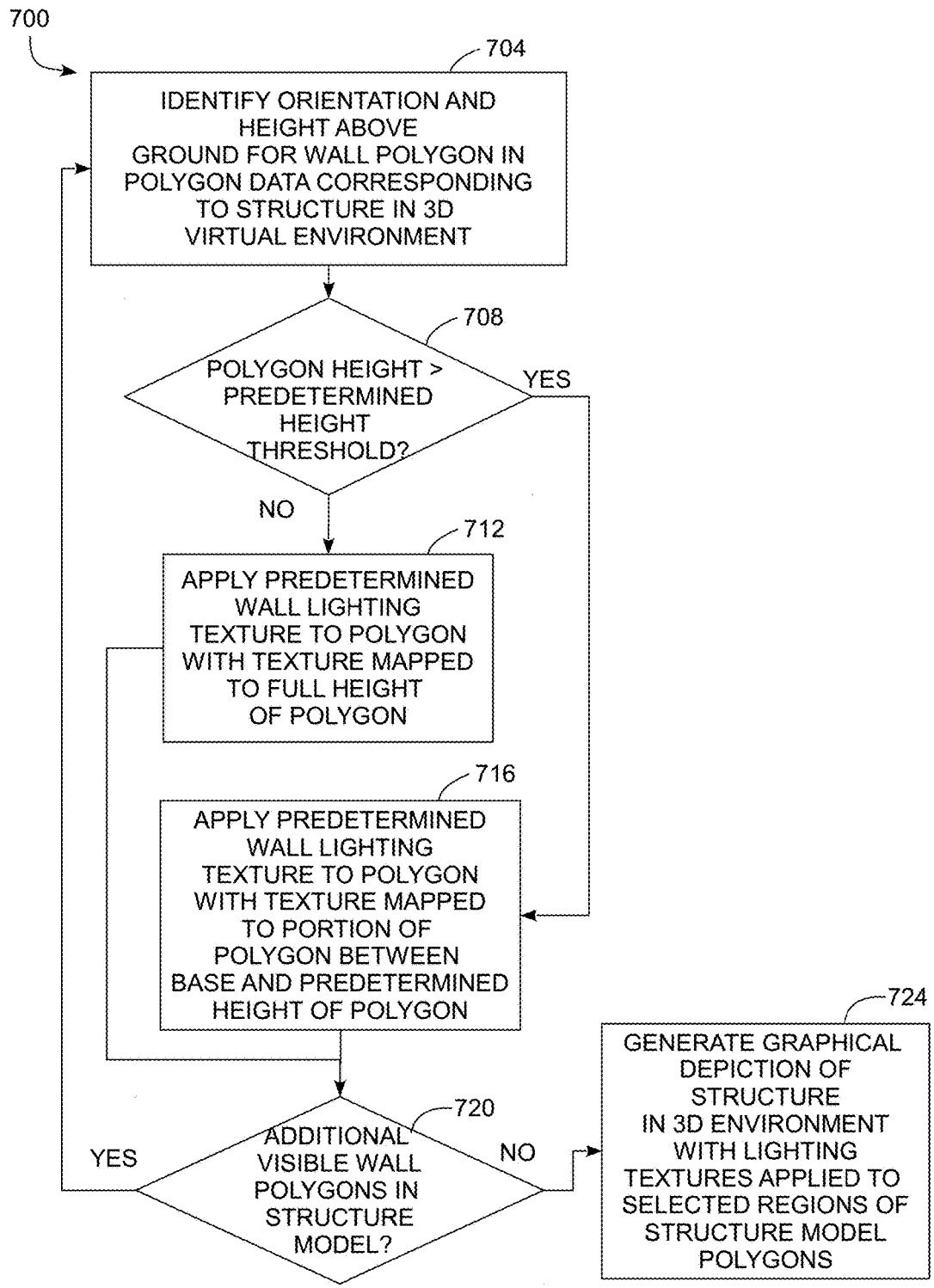
FIG. 7 is a block diagram of a process for generating and displaying wall lighting effects on polygons corresponding to walls of structures in a 3D virtual environment.

In addition to generating ground effect shadows and highlights, the computing system 104 is configured to apply wall shadow highlights to structures that are displayed in the 3D virtual environment. FIG. 7 depicts a process 700 for applying wall lighting textures, including shadows and highlights, to polygons in a structure that is displayed in a 3D virtual environment. In the description below, a reference to the process 700 performing or doing some function or action refers to one or more controllers or processors that are configured with programmed instructions, which are executed by the controllers or processors to implement the process performing the function or action or operating one or more components to perform the function or action. The process 700 is described with reference to the computing system 100 of FIG. 1 for illustrative purposes.

Process 700 begins with identification of the orientation and height above ground for a wall polygon in a polygon data corresponding to a structure in the 3D virtual environment (block 704). The processor 108 identifies the orientation of the structure with respect to the ground using the same method as described above with reference to the processing of block 204 in the process 200. A wall polygon refers to a polygon in the structure that extends upward from the ground in the virtual environment. Structures often include non-wall polygons, such as polygons that correspond to the roof of the building, in addition to wall polygons. The processor 108 identifies the height of the wall polygon using the dimensions of the polygon in the polygon data, the identified orientation of the polygon, and the angle between the wall polygon and the surrounding ground in the virtual environment. In some embodiments, the wall polygon is perpendicular to the ground, and the height of the wall polygon is the dimension of the wall polygon that extends upward from the ground. If the angle between the wall polygon and the ground is not a perpendicular angle, then the processor 108 identifies the height of the wall using trigonometric techniques such as multiplying the sine function value of the angle between the wall polygon and the ground by the length of the wall polygon.

In process 700, if the height of the wall polygon is less than a predetermined height threshold (block 708), then the processor 108 applies a lighting texture, such as a shadow or highlight texture, to the entire surface of the wall polygon (block 712). In one embodiment, the processor 108 identifies $R_w$, which is the height for the wall texture, as the full height of the wall polygon. If, however, the height of the wall polygon is greater than the predetermined height threshold (block 708), then the lighting texture is applied to only a portion of the wall polygon extending from the ground up to the predetermined height of the polygon. The processor 108 assigns $R_w$ a value that corresponds to the predetermined height threshold.

In the processing of both blocks 712 and 716, the processor 108 applies the lighting texture to the wall polygon up to the identified height $R_w$ above the ground in the virtual environment. In the processor 108, the programmable pixel shaders in the GPU map the lighting texture to the individual pixels on the wall polygon using the following functions:

$$u = \text{length}(\text{vec2}(V_x, V_Y))$$

$$v = \text{clamp}((V_z - G)/R_w, 0.0, 1.0)$$

Where u and v are the selected two-dimensional coordinates in the texture that are selected to be mapped to each pixel in the region of the wall polygon that receives the lighting texture, the values $V_x$, $V_y$, $V_z$ are the three-dimensional coordinates of the pixel in the region that is receiving the lighting texture, G is the height of the ground in the virtual environment, and $V_z - G$ is the height of the pixel in the wall polygon above the ground. The "clamp" term used above is used to limit the identified v value between the bounds of the 0.0 and 1.0 arguments to the clamp function.

Process 700 continues for processing of additional visible wall polygons in the structure in the same manner as described above with reference to the processing of blocks 704-716 (block 720). Some building models include wall polygons of varying heights. After processing each of the visible wall polygons in the structure (block 720), the processor 108 generates a visual output of the structure with the lighting textures applied to the wall polygons (block 724). In the computing system 104, the display device 144 generates a visual display of the virtual environment including the structure with the lighting textures applied to the wall polygons based on the height of the wall polygons. During process 700, the processor 108 applies lighting textures across the walls with either a uniform lighting texture height, or the entire height of the wall polygon if the wall polygon is below the predetermined threshold height. Thus, the generated lighting effects are uniform across multiple wall polygons in a single structure, and the processor 108 applies the process 700 to multiple structures in the 3D virtual environment to generate uniform wall lighting effects in multiple structures in a consistent manner.

Figure 9:
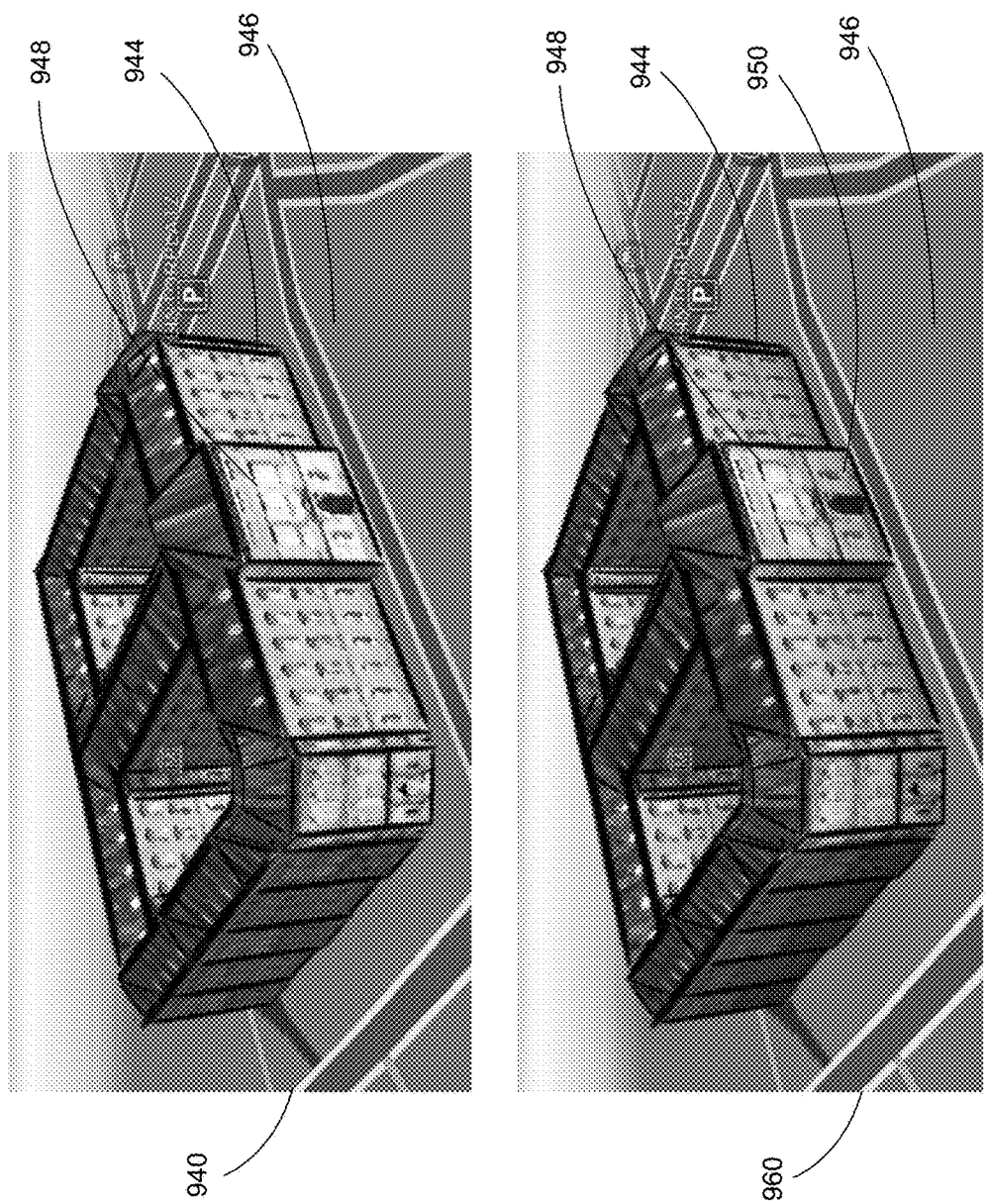
FIG. 9 is a first graphical display of a 3D structure without a wall lighting effect and a second graphical display of the 3D structure with the wall lighting effect that is generated using the process of FIG. 3.

FIG. 9 depicts two displays 940 and 960 of a structure 944 in a virtual environment. In the display 940, the structure 944 includes a plurality of wall polygons, such as wall polygon 948, which extends upwardly from a graphical representation of the ground 946. The display 940 does not depict an additional lighting texture applied to the wall polygons in the structure 944, while the display 960 includes wall shadows 950 that are mapped to the wall polygons in the structure 944. The wall shadows darken the lower portion of the wall polygons up to the predetermined heights, or the entire height of the wall polygon if the wall polygon is shorter than the predetermined height. The shadow textures simulate the effects of reflected light from the ground 946 surrounding the structure 944 on the surfaces of the wall polygons in the structure 944. The shadow effects are strongest proximate to the ground 946 and gradually reduce in intensity as the wall polygons extend away from the ground 946.

Figure 10:
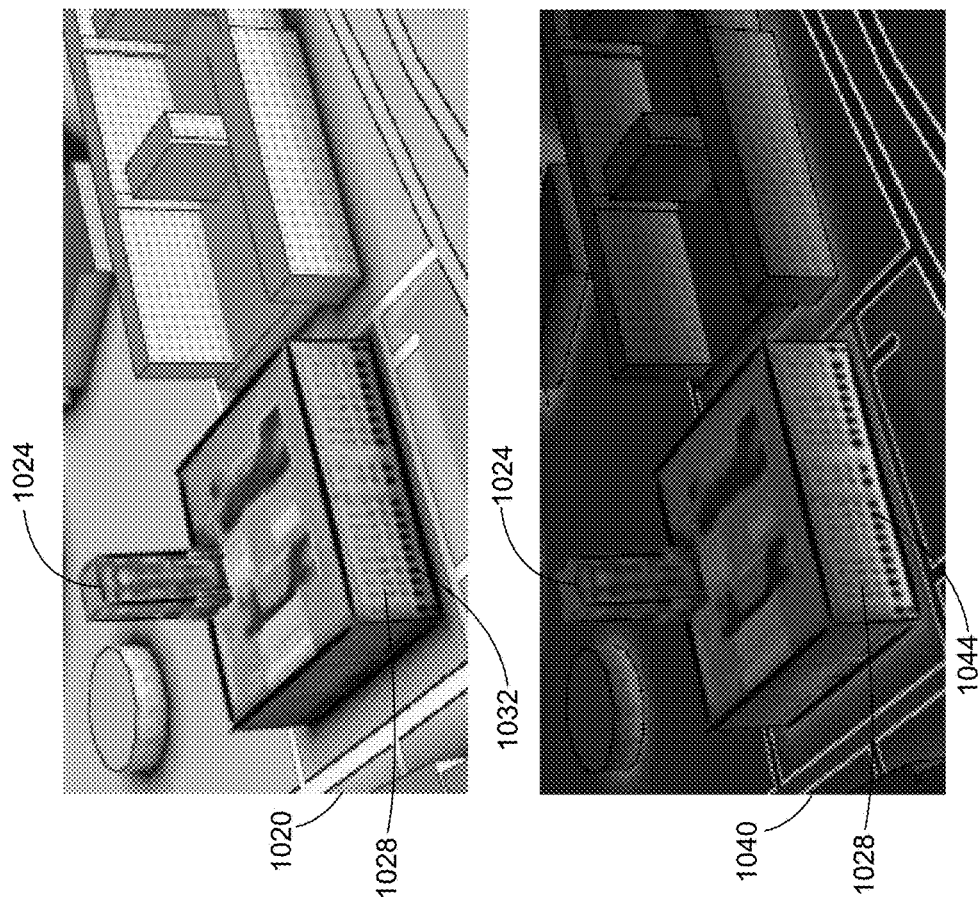
FIG. 10 depicts a first graphical display of a 3D structure with a wall shadow texture applied to the 3D structure and a second graphical display of the 3D structure with a wall highlight texture applied to the 3D structure.

As described above, the computing system 104 is configure to apply lighting textures, including both shadow textures and highlight textures, to wall polygons in the structure polygon models that are located in the 3D virtual environment. FIG. 10 depicts two displays 1020 and 1040 of a structure 104 in a virtual environment under daylight and night lighting conditions. In the display 1020, the virtual environment is depicted in daylight. The structure 1024 includes wall polygons, such as wall polygon 1028, and the processor 108 applies a wall shadow texture 1032 to the wall polygons as described above in the process 700. The wall shadow effects darken the wall polygons in the building model 1024 to approximate the effects of reflected light from the ground and surrounding objects in the virtual environment around the building 1024. In the display 1040, the building 1024 is depicted at night. The processor 108 applies a highlight texture to the wall polygons in the building 1024, such as the highlight texture 1044 applied to the wall polygon 1028 in the display 1040. The highlight textures approximate the reflections of streetlights and other ambient artificial light sources from the wall polygons in the structure 1024.

The wall shadow and highlight effects that the computing system 104 generates during process 700 produce a visual output that is similar to the outputs of ambient occlusion processes that are used in existing 3D graphics systems. The processing described above in FIG. 7, however, does not require processing of a global illumination source in the virtual environment and lighting of individual structures based on the light projected from the global illumination source and reflected from surrounding objects in the manner required by ambient occlusion. Consequently, the process 700 produces a visual effect that is similar to ambient occlusion in a wide range of 3D virtual environments, but requires only a fraction of the computational complexity that is entailed with the full ambient occlusion process.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed is:

1. A method for generating a shadow for a three-dimensional graphics object comprising:
   identifying data corresponding to a plurality of polygons in a three-dimensional graphical model that depicts an object;
   identifying a plurality of coordinates corresponding to vertices in the plurality of polygons in a base of the object;
   generating a convex polygon that encompasses the plurality of coordinates;
   generating a hard shadow mesh corresponding to the convex polygon, the hard shadow mesh including a plurality of vertices;
   generating a soft-shadow mesh including a plurality of polygons that each include at least one vertex in common with the plurality of vertices in the hard shadow mesh, the generation of the soft shadow mesh further comprising:
      identifying a first vertex and a second vertex in the convex polygon, the first vertex and the second vertex being co-linear in the convex polygon; and
      generating a portion of the soft-shadow mesh including two triangles that form a first rectangle extending outward from the convex polygon, the first rectangle including the first vertex and the second vertex;
   applying a predetermined shadow texture to the soft shadow mesh; and
   rendering the object and the shadow mesh in the three-dimensional graphical model with a display device to depict the object with a ground shadow effect.

2. The method of claim 1 further comprising:
   identifying a surface in the three-dimensional graphical model that engages the base of the object;
   arranging the soft-shadow mesh to extend from the base of the object across a portion of the surface; and
   rendering the surface under the soft-shadow mesh in the graphical scene.

3. The method of claim 1, the generation of the hard shadow mesh further comprising:
   tessellating the convex polygon into a plurality of triangles that form the hard shadow mesh.

4. The method of claim 1, the generation of the soft shadow mesh further comprising:
   identifying a third vertex in the convex polygon, the third vertex being co-linear with the second vertex;
   generating another portion of the soft-shadow mesh including two triangles that form a second rectangle extending outward from the convex polygon, the second rectangle including the second vertex and the third vertex; and
   generating at least one triangle having one vertex in common with the second vertex and extending in a gap formed between the first rectangle and the second rectangle.

5. A system for display of three-dimensional objects with shadow comprising:
   a memory configured to store data corresponding to a plurality of polygons in a three-dimensional graphical model that depicts an object;
   a display device configured to generate a visual depiction of the three-dimensional graphical model; and
   a processor operatively connected to the memory and the display device, the processor being configured to:
      identify the plurality of polygons in the data corresponding to the three-dimensional graphical model stored in the memory;
      identify a plurality of coordinates corresponding to vertices in the plurality of polygons in a base of the object;
      generate a convex polygon that encompasses the plurality of coordinates;
      generate a hard shadow mesh corresponding to the convex polygon, the hard shadow mesh including a plurality of vertices;
      generate a soft-shadow mesh including a plurality of polygons that each include at least one vertex in common with the plurality of vertices in the hard shadow mesh, the generation of the soft shadow mesh comprising:
         identifying a first vertex and a second vertex in the convex polygon, the first vertex and the second vertex being co-linear in the convex polygon; and
         generating a portion of the soft-shadow mesh including two triangles that form a first rectangle extending outward from the convex polygon, the first rectangle including the first vertex and the second vertex;
      apply a predetermined shadow texture to the soft shadow mesh; and
      render the three-dimensional graphical model with the object and the textured soft shadow mesh with the display device to depict the object with a ground shadow effect.

6. The system of claim 5, the processor being further configured to:
   identify a surface in the three-dimensional graphical model that engages the base of the object;
   arrange the soft-shadow mesh to extend from the base of the object across a portion of the surface; and
   render the surface under the soft-shadow mesh.

7. The system of claim 5, processor being further configured to:
   tessellate the convex polygon into a plurality of triangles to form the hard shadow mesh.

8. The system of claim 5, the processor being further configured to:
   identify a third vertex in the convex polygon, the third vertex being co-linear with the second vertex;
   generate another portion of the soft-shadow mesh including two triangles that form a second rectangle extending outward from the convex polygon, the second rectangle including the second vertex and the third vertex; and generate at least one triangle having one vertex in common with the second vertex and extending in a gap formed between the first rectangle and the second rectangle.

* * * * *